2,753,273
Patented July 3, 1956

2,753,273
MIXTURE OF CELLULOSE ETHERS

Saul G. Cohen, Lexington, and Howard C. Haas, Arlington, Mass., assignors to Polaroid Corporation, Cambridge, Mass., a corporation of Delaware No Drawing. Application October 25, 1952, Serial No. 316,936

4 Claims. (Cl. 106—197)

The present invention relates to mixtures of compatible cellulose ethers capable of being used, for example, in the manufacture of optically clear products such as films and molded articles that are both strong and flexible even at relatively low temperatures.

Dobry and Boyer-Kawenoki, Journal of Polymer Science, vol. II, p. 90, 1947, have demonstrated that high polymers are, in general, incompatible with each other. Gee, Quarterly Review of the Chemical Society, vol. I, p. 265, 1947, in a thermodynamic explanation of this fact, has shown that the entropy gain on mixing two polymers is so small that even a slight positive heat of mixing results in almost complete immiscibility. Polymeric plasticizers, however, are in many respects superior to low molecular weight plasticizers. For example, polymeric plasticizers are less susceptible than are low molecular weight plasticizers to migration, sweating and volitilazation loss.

Accordingly, an object of the present invention is the provision of a novel composition of matter comprising as its characteristic ingredient a mixture of at least two compatible high polymers at least one of which acts as a plasticizer.

A specific object of the present invention is the provision of a polymeric material comprising as its characteristic ingredient a mixture of an ethyl cellulose and an ether of hydroxyethyl cellulose.

Other objects of the invention will in part be obvious and will in part appear hereinafter.

Accordingly, the invention will be exemplified in the following specification and its scope will be indicated in the appended claims.

Generally, the present invention contemplates the provision of a composition of matter comprising as its characteristic or predominating ingredient a mixture of compatible cellulose derivatives, one of which is an ethyl cellulose and the other of which is an ether of hydroxyethyl cellulose. It is believed that such cellulose derivatives are compatible by reason of their similar cohesive energy densities. Since ethyl cellulose possesses a relatively high Young's modulus, yield stress and tensile strength and since ethers of hydroxyethyl cellulose possess a relatively high degree of extensibility, blends of these cellulose derivatives possess mechanical properties which may be advantageously controlled without introducing low molecular weight plasticizers. In accordance with the present invention, the ethyl cellulose and the ether of hydroxyethyl cellulose are individually prepared and subsequently mixed.

As examples of the class of ethers of hydroxyethyl cellulose that may be employed in the practice of the present invention, mention may be made of alkyl ethers of hydroxyethyl cellulose such, for example, as the propyl, butyl, amyl and hexyl ethers of hydroxyethyl cellulose and arylalkyl ethers of hydroxyethyl cellulose such, for example, as benzyl ether of hydroxyethyl cellulose. Such ethers may be prepared, for example, by treating hydroxyethyl cellulose steeped in alkali with the appropriate alkyl halide or mixtures of alkyl halides at elevated temperature either under reflux or in a pressure vessel, preferably in the absence of oxygen.

A simple method of mixing the two cellulose derivatives is to dissolve them in a common solvent and thereafter to allow the solvent to evaporate. As examples of suitable common solvents, mention may be made of dioxane, aromatic hydrocarbons such as benzene and toluene, esters such as ethyl acetate and butyl acetate, ketones such as acetone and methylethyl ketone, chlorinated hydrocarbons such as chloroform and carbon tetrachloride, and mixtures of an alcohol such as ethyl alcohol and an aromatic hydrocarbon such as toluol.

The herein disclosed invention is illustrated in the following nonlimiting examples:

EXAMPLE I

A butyl ether of hydroxyethyl cellulose suitable for use in accordance with the present invention was prepared as follows: 126 grams of hydroxyethyl cellulose, containing about 1.50 mols of combined ethylene oxide per anhydroglucose unit, sold by Carbide and Carbon Chemical Corporation under the trade name "WPLH Blend 1C," were steeped in a solution of 400 grams of sodium hydroxide in one liter of water and reacted with 800 grams of butyl bromide under reflux for six and one-half hours. Analysis of the resulting butyl ether of hydroxyethyl cellulose for carbon and hydrogen yielded the following results: C–60.1%, H–9.5%. These results indicated a degree of substitution of about 2.03 butyl groups per anhydroglucose unit. Analysis by the acetylation method of Malm, Genung and Williams, Industrial and Engineering Chemistry, Analytical edition, vol. 14, p. 935, 1942, indicated a degree of substitution of 2.09 butyl groups per anhydroglucose unit in good agreement with the carbon and hydrogen analysis.

EXAMPLE II

Mixtures of ethyl cellulose and butyl hydroxyethyl cellulose exemplifying the present invention were prepared in the following manner. Butyl hydroxethyl cellulose prepared in accordance with Example I and ethyl cellulose having a degree of substitution of about 2.48 to 2.58 ethyl groups per anhydroglucose unit, sold by Dow Chemical Company under the trade name "Standard Ethoxy Ethocel," were dissolved in benzene. The solution was such that it contained about 15% of polymer by total weight. The solution was filtered under pressure through felt and airplane cloth, degassed and cast on a clean level glass surface at a doctor blade setting of 0.070 inch. After the layer so formed set to a rigid gel, a second layer was cast on it at a doctor blade setting of 0.080 inch. The resulting film was allowed to dry thoroughly in air first at room temperature and then at 45° C. The film finally was stripped from the glass and dried for four days at 50° C. in a vacuum. All films so prepared were almot prefectly transparent and had thicknesses within the range of 14.5–16.0×10⁻³ inches.

Measurements of the mechanical properties of films prepared in the foregoing manner having different total weight fractions of butyl hydroxyethyl cellulose are characterized in the following table. These measurements were carried out at room temperature on an Instron machine set to pull with a total scale load of twenty pounds and using a constant rate of elongation of one inch per minute.

Table 1

[Stress-elongation data, room temp., mixed ethyl cellulose-butyl HEC films.]

| Composition, Wt. Fraction of Butyl HEC | Young's Modulus in lbs./in.² | Yield Stress in lbs./in.² | Ultimate Tensil Strength in lbs./in.² | Percent Elongation at Break | Total Energy Required for Break in ft., lbs./in.² |
|---|---|---|---|---|---|
| 0.00 | 2.78×10⁵ | 6,390 | 7,648 | 22.7 | 245 |
| 0.25 | 2.05 | 5,500 | 6,870 | 27.0 | 250 |
| 0.50 | 1.31 | 3,985 | 5,673 | 40.1 | 294 |
| 0.75 | 1.05 | 2,545 | 4,148 | 55.6 | 287 |
| 1.00 | 0.61 | 1,499 | 2,455 | 82.6 | 264 |

The smooth transition in physical properties with increase in weight fraction of butyl hydroxyethyl cellulose is to be noted. This supports the belief that ethyl cellulose and ether of hydroxyethyl cellulose are truly compatible for the reason that mixtures of incompatible polymers usually have properties which are inferior to one or the other of the incompatible polymers in the pure state.

Since departures from the foregoing disclosure are contemplated within the scope of the invention herein involved, it is intended that all matter described above be interpreted in an illustrative and not in a limiting sense.

What is claimed is:

1. A composition of matter comprising as mixed compatible characteristic ingredients an ethyl cellulose and a member selected from the class consisting of lower alkyl ethers of hydroxyethyl cellulose and benzyl ethers of hydroxyethyl cellulose.

2. A composition of matter comprising as compatible characteristic ingredients an ethyl cellulose and a member selected from the class consisting of lower alkyl ethers of hydroxyethyl cellulose and benzyl ethers of hydroxyethyl cellulose, said ethyl cellulose and said members of said class having been individually prepared and subsequently mixed.

3. A composition of matter containing as characteristic ingredients a mixture of ethyl cellulose and butylated hydroxyethyl cellulose.

4. A composition of matter containing as characteristic ingredients ethyl cellulose having an average degree of substitution of about two and one-half ethyl groups per anhydroglucose unit and a butylated hydroxyethyl cellulose having an average degree of substitution of about one and one-half combined cellulose ethylene oxide and of about two butyl groups per anhydroglucose unit, the ethyl cellulose and the butylated hydroxyethyl cellulose having been individually prepared and subsequenty mixed.

References Cited in the file of this patent

UNITED STATES PATENTS

| 2,056,795 | Macht et al. | Oct. 6, 1936 |
| 2,193,831 | Mitchell | Mar. 19, 1940 |
| 2,398,047 | Schmidt | Apr. 9, 1946 |

OTHER REFERENCES

Haas et al.: Jour. Ind. and Eng. Chem. 45, pages 564–566 (1953), received by the Publisher August 23, 1952.